(12) United States Patent
Borrico

(10) Patent No.: US 10,921,091 B2
(45) Date of Patent: Feb. 16, 2021

(54) HOLOGRAPHIC WEAPON SIGHT

(71) Applicant: James Borrico, Bridgeport, CT (US)

(72) Inventor: James Borrico, Bridgeport, CT (US)

( * ) Notice: Subject to any disclaimer, the term of this patent is extended or adjusted under 35 U.S.C. 154(b) by 285 days.

(21) Appl. No.: 15/948,168

(22) Filed: Apr. 9, 2018

(65) Prior Publication Data

US 2018/0292168 A1    Oct. 11, 2018

Related U.S. Application Data

(60) Provisional application No. 62/482,885, filed on Apr. 7, 2017.

(51) Int. Cl.
*F41G 1/30* (2006.01)
*F41G 3/06* (2006.01)
*G03H 1/00* (2006.01)
*G03H 1/22* (2006.01)
*F41G 3/16* (2006.01)

(52) U.S. Cl.
CPC .............. *F41G 1/30* (2013.01); *F41G 3/065* (2013.01); *G03H 1/0005* (2013.01); *G03H 1/2294* (2013.01); *F41G 3/16* (2013.01); *G03H 2001/2234* (2013.01); *G03H 2001/2284* (2013.01); *G03H 2210/20* (2013.01)

(58) Field of Classification Search
CPC ... F41G 1/30; F41G 1/38; F41G 1/345; F41G 1/545; F41G 1/35; F41G 3/065; F41G 3/16; G03H 1/2294; G03H 1/0005; G03H 2001/2284; G03H 2001/2234; G03H 2210/20

USPC .......................................................... 33/298
See application file for complete search history.

(56) References Cited

U.S. PATENT DOCUMENTS

| | | | | |
|---|---|---|---|---|
| 5,483,362 A | * | 1/1996 | Tai | F41G 1/30 359/1 |
| 10,345,077 B1 | * | 7/2019 | Loebig | G02B 5/32 |
| 2005/0268521 A1 | * | 12/2005 | Cox | F41G 3/08 42/130 |
| 2006/0010760 A1 | * | 1/2006 | Perkins | F41G 1/38 42/142 |
| 2006/0164704 A1 | * | 7/2006 | Sieczka | F41G 1/30 359/15 |
| 2008/0104875 A1 | * | 5/2008 | Mayerle | F41G 1/40 42/118 |
| 2010/0273131 A1 | * | 10/2010 | Lim | F41A 33/02 434/21 |
| 2011/0132983 A1 | * | 6/2011 | Sammut | F41G 1/38 235/404 |
| 2011/0185619 A1 | * | 8/2011 | Finnegan | F41G 1/35 42/117 |

(Continued)

*Primary Examiner* — Yaritza Guadalupe-McCall
(74) *Attorney, Agent, or Firm* — Ziegler IP Law Group, LLC

(57) ABSTRACT

A optic sight apparatus for a weapon that includes an electro-optical sight unit configured to project a reticle image for a sight setting of the optic sight apparatus, a controller electrically connected to the electro-optical sight unit; and a switching apparatus connected to the controller unit, the switching apparatus configured to transmit a sighting control signal to the controller unit to automatically change a current sight setting of the optic sight apparatus to a predetermined sight setting of the optic sight apparatus corresponding to the sighting control signal.

20 Claims, 5 Drawing Sheets

(56) References Cited

U.S. PATENT DOCUMENTS

| | | | |
|---|---|---|---|
| 2015/0029567 A1* | 1/2015 | Collin | G03H 1/22 |
| | | | 359/13 |
| 2015/0176949 A1* | 6/2015 | Varshneya | F41G 3/165 |
| | | | 235/404 |
| 2015/0267998 A1* | 9/2015 | Grace, Jr. | F41G 1/345 |
| | | | 42/117 |
| 2015/0345906 A1* | 12/2015 | Varshneya | F41G 3/06 |
| | | | 235/404 |
| 2016/0084617 A1* | 3/2016 | Lyren | F41G 3/08 |
| | | | 42/135 |
| 2016/0290764 A1* | 10/2016 | Chen | F41G 3/02 |
| 2016/0327365 A1* | 11/2016 | Collin | G02B 27/0189 |
| 2016/0341521 A1* | 11/2016 | Bigby | F41G 1/35 |
| 2016/0377377 A1* | 12/2016 | Collin | F41G 1/30 |
| | | | 42/113 |
| 2016/0377378 A1* | 12/2016 | Collin | F41G 1/30 |
| | | | 42/113 |
| 2018/0292168 A1* | 10/2018 | Borrico | F41G 1/30 |
| 2019/0301833 A1* | 10/2019 | Campbell | G03B 29/00 |
| 2019/0377171 A1* | 12/2019 | Hammond | F41G 1/38 |
| 2019/0383578 A1* | 12/2019 | Mills | G02B 17/0808 |
| 2020/0011638 A1* | 1/2020 | Mills | G02B 27/4205 |
| 2020/0232765 A1* | 7/2020 | Patton | F41G 1/545 |
| 2020/0278178 A1* | 9/2020 | Chavez | F41G 1/35 |

* cited by examiner

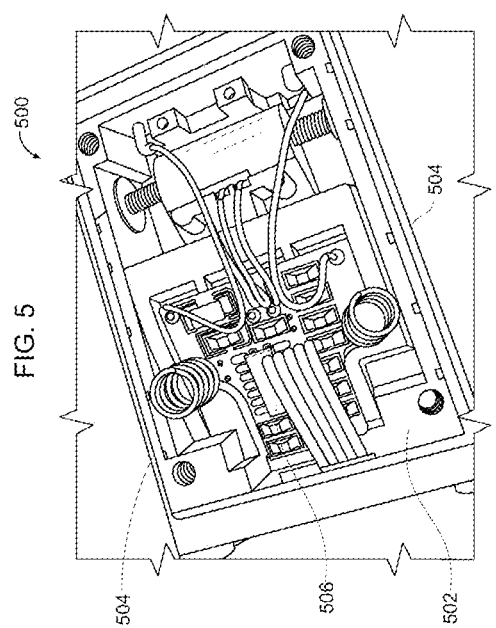

HOLOGRAPHIC WEAPON SIGHT

FIELD

The aspects of the disclosed embodiments are directed to sights for guns. In particular, the aspects of the disclosed embodiments are directed to gun sights which can be toggled between multiple sight settings, such as close quarter combat sight settings and long range sight settings.

BACKGROUND

On a rifle range or pistol range, knowledge of the accuracy of a rifle, shotgun or pistol is necessary if a shooter is to determine where to aim to hit a target (or to group shot on a target in the case of a shotgun). Acquiring that knowledge has been a problem for many years. All manufacturers of firearms perform some sighting-in of the guns they manufacture, but each owner of a gun has to work out, independently, how to aim the gun to have the best chance of success.

The typical gun will be sighted for one range setting. The setting is manually set. Once the sight is adjusted for a specific range, a manual re-adjustment is required if it is desired to switch the sight setting for another or different range. This is impractical when working with weapons such as guns that require accuracy in both close quarter settings as well as long range settings, particularly when there is not sufficient time to make such manual settings.

For such a sight, the operator must know how to manipulate the weapon to maintain accuracy when in a situation that does not correspond to the particular sighting.

This might include aiming up or down from the target to compensate. This can be impractical when quick changes are required or desired.

A holographic weapon sight or holographic diffraction sight is a non-magnifying gun sight that allows the user to look through a glass optical window and see a reticle image superimposed at a distance on the field of view. The hologram of the reticle is built into the window and is illuminated by a laser diode.

Holographic weapon sights use a laser transmission hologram of a reticle image that is recorded in three-dimensional space onto holographic film at the time of manufacture. This image is part of the optical viewing window. The recorded hologram is illuminated by the collimated light of a laser diode built into the sight. The sight can be adjusted for range and windage by simply tilting or pivoting the holographic grating. To compensate for any change in the laser wavelength due to temperature, the sight employs a holography grating that disperses the laser light by an equal amount but in the opposite direction as the hologram forming the aiming reticle. Like the reflector sight, the holographic sight is not "parallax free", having an aim-point that can move with eye position. This can be compensated for by having a holographic image that is set at a finite distance with parallax due to eye movement being size of the optical window at close range and diminishing to zero at the set distance (usually around a desired target range of 100 yards).

Since the reticle is a transmission hologram, illuminated by a laser shining through hologram presenting a reconstructed image, there is no need for the sight "window" to be partially blocked by a semi-silvered or dielectric dichroic coating needed to reflect an image in standard reflex sights. The optical window in a holographic weapon sight looks like a piece of clear glass with an illuminated reticle in the middle. The aiming reticle can be an infinitely small dot whose perceived size is given by the acuity of the eye. For someone with 20/20 vision, it is about 1 minute of arc.

One drawback of a holographic sight is shorter battery life when compared to reflex sights that use LEDs, such as red dot sights. The laser diode in a holographic sight uses more power and has more complex driving electronics than a standard LED of an equivalent brightness, reducing the amount of time a holographic sight can run on a single set of batteries (around 100 hours for typical sight).

The term offset refers to the difference between the centerline of the gun's bore and the aiming point of the gun's sight system. This sight system could be as simple as a brass bead or as complex as an ACOG magnified optic.

When discussing duty pistols or traditional shotguns the distance between the top edge of the front sight and the center of the bore will typically be less than an inch. For instance, the bore to sight offset on a GLOCK17™ with XS Big Dot™ is 0.54 inches. Using factory sights, the sight offset can be less than a half inch.

Now consider the standard height "A2" front sight housing on an AR™ rifle. The offset is just a bit more than 2.5 inches. Many magnified optic makers will install a mini red-dot sight atop the magnified optic for fast, close in shooting. The offset now climbs to a startling five inches.

When police officers use a patrol carbine they are generally using it as a power tool as opposed to a long range, precision instrument. Patrol rifles are not sniper rifles and patrolmen are not expected to take out enemy personnel at five hundred yards.

A patrol rifle will be most often used within twenty-five yards. Inside a building that distance shrinks considerably. AR offset is most pronounced from the muzzle out to around seven yards. What looks like a solid shot ends up impacting three inches low.

In the police arena we have to account for every shot fired and the real world is filled with people that should not be shot. Compound this with the fact that most bad guys don't give the full-frontal B-27 silhouette that law enforcement practices on. Instead you get a partially obstructed, moving target that likes to duck behind cover.

When it was better understood, firearms trainers would stand on the line yelling "remember your offset". What we have found from after action reviews is that under the extreme stress of life and death combat calculating offset is about as easy and counting your shots or Chinese arithmetic.

Keeping it simple and straight forward would seem to be the way to go. We all know that training time and range time are not what they should be. Rather than complicate the situation we can use the recently available hardware to make are our shots count.

Why zero at 100 or 50 yards when the biggest room in an average home is not even 10 yards? Some people may consider zeroing the carbine at a very short distance, say 15 yards, using the logic that inside the home they will never engage anything farther than that given a likely self-defense distance of less than 7 yards. That may be true, but the negative results of a 15-yard zero become obvious when examining the bullet's path at distances greater than 20 yards, and realizing that a holdover (aiming above your intended target to compensate for bullet drop) will still need to be used at shorter distances.

With a 15-yard zero, the bad news is at 10 yards the bullet is about an inch low, and at 5 yards it is about 2 inches low. At 25 yards, the bullet is almost 2 inches HIGH. At 50 yards it is about 6 inches ABOVE Line of Sight (LOS) and at 75 yards it's 10 inches HIGH. When you hit 100 yards, the shooter would need to aim almost 14 inches BELOW the desired point of impact. This is a lot to remember in a high pressure or life-threatening situation.

With a 200-yard zero, the bullet does rise above LOS, but not more than about 2 inches at 120 yards, so hold unders are negligible, and the holdovers at 25 yards and closer are similar to the 100-yard zero.

Exemplary Bullet Path Relative to LOS Using Different Zero Ranges

| Target Distance | 15-yard zero | 25-yard zero | 50-yard zero | 100-yard zero | 200-yard zero |
|---|---|---|---|---|---|
| 5 yd | −1.8 | −2.1 | −2.4 | −2.5 | −2.4 |
| 10 yd | −0.9 | −1.6 | −2.1 | −2.2 | −2.1 |
| 25 yd | +1.8 | 0.0 | −1.2 | −1.6 | −1.4 |
| 50 yd | +5.9 | +2.4 | 0.0 | −0.8 | −0.3 |
| 100 yd | +13.4 | +6.5 | +1.6 | 0.0 | +1.1 |
| 150 yd | +20 | +9.4 | +2.1 | −0.4 | +1.2 |
| 200 yd | +25 | +11 | +1.1 | −2.1 | 0.0 |

The above data is average based.

Through training and experience shooters have trouble with mechanical sight offset, the problem created by the sight of rifles being roughly two inches above the bore. What this means is that no matter now meticulously a weapon is sighted, in that weapon, the Battle Sight Zero (BZO), which a sight setting that soldiers keep on their weapons to provide the highest probability of hitting most high-priority combat targets with minimum adjustment to the aiming point, a 250 meter sight, no longer applies. That round is no longer in the precise parabolic arc that you established; rather the effects of air resistance and gravity take root with some immediacy. As you sighted in, you arced the trajectory of the round to intersect the sight plane at a specified distance.

It would be advantageous to be able to toggle or switch a weapon sight, such as a holographic weapon sight, between, multiple preset zeroed sights in a quick and efficient manner without the need for the typical manual sighting and zeroing process. It would also be advantageous to provide a weapon sight, such as a holographic weapon sight, that is configured to allow for toggling or switching between multiple preset zeroed sights or sight settings.

Accordingly, it would be desirable to be able to provide an apparatus that addresses at least some of the problems identified above.

SUMMARY

The aspects of the disclosed embodiments are directed to an apparatus that enables a weapon sight to toggle between different sight settings, such as between a close sight setting and a long range setting without the need for the user to manually adjust the typical sight settings. The problems addressed by the aspects of the disclosed embodiments are solved by the subject matter of the independent claims. Further advantageous modifications can be found in the dependent claims.

According to a first aspect, the aspects of the disclosed embodiments are directed to a optic sight apparatus for a weapon that includes an electro-optical sight unit configured to project a reticle image for a sight setting of the optic sight apparatus, a controller electrically connected to the electro-optical sight unit, and a switching apparatus connected to the controller unit. The switching apparatus is configured to transmit a sighting control signal to the controller unit to automatically change a current sight setting of the optic sight apparatus to a predetermined sight setting of the optic sight apparatus corresponding to the sighting control signal.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which:

FIG. 5 illustrates an exemplary electronics module for a holographic sight incorporating aspects of the disclosed embodiments.

DETAILED DESCRIPTION OF THE DISCLOSED EMBODIMENTS

The aspects of the disclosed embodiments are directed to a gun sight, such as a holographic gun sight, which will automatically switch or toggle between different sight settings, such as between a close sight setting and a long range sight setting. The sight settings are prestored and the activation of a desired sight mode, such as close range or long range, will automatically change or adjust the sight setting of the weapon to the selected state. The aspects of the disclosed embodiments are also directed to a toggling or switching apparatus for a weapon or gun sight, such as holographic weapon sight, that can be installed on a weapon, such as a gun.

The term "gun" as is used herein can include any such weapon, including for example, a pistol or rifle. The switching apparatus or device, also referred to herein as a universal switchable component, enables a shooter to transition between multiple preset zeroed sights of a holographic weapon sight, seamlessly. While a holographic weapon sight is generally referred to herein, the aspects of the disclosed embodiments are not so limited. In alternate embodiments, the gun sight can include any suitable sight that can be enable for such toggling and switching.

In one embodiment, the switching apparatus can be manufactured within or as part of an existing gun sight, or affixed to existing holographic, LED and red dot sights. The switchable component will be weather proof and easily manipulated. The switching apparatus will have one or more indicators identifying which preset zero has been selected or activated and is in use. In one embodiment, the indicator can be displayed on the holographic window, display screen or sight picture window or be a part of the button or switch that is used to activate the particular sight mode or setting. In one embodiment, the indicator is in the form of an LED indicator, or other suitable light source. The switchable competent source of power will be existing battery source.

The aspects of the disclosed embodiments are embodied in a reticle for a gunsight and a precise method for using the reticle in a variance of distances and any size target, to provide precise drop compensation aiming points for up to a multitude of zeros. To provide an accurate lead point for moving targets, thereby providing an accurate and effective method for aiming the rifle, all with easy and fast mental work that does not require extraordinary effort by the shooter or any knowledge of the particular ballistic characteristics of load or gun used.

Figure 1:
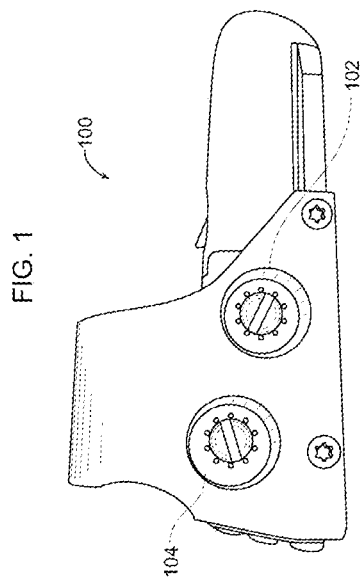
FIG. 1 illustrates a typical zeroing mechanism for a gun sight.

FIG. 1 illustrates a typical zeroing mechanism 100 for a holographic sight, also referred to as a manual zero sight setting adjustment device. In this example there are two manual adjustment mechanisms or dials 102, 104 located on the side of the sight. One dial adjusts elevation while another adjusts for span. The adjustments made using the dials 102, 104 shown in FIG. 1 will alter the positioning of the reticle or red dot 202 shown in FIG. 2. The up and down arrows 204, 206 shown in FIG. 2 can be used to adjust the brightness of the reticle 202 (red circle and dot). The circular button 208 in this example is for use with night vision goggles. In typical use, manual adjustment of the dials 102, 104 is required for different sight settings, such as close range and long range.

Figure 3:
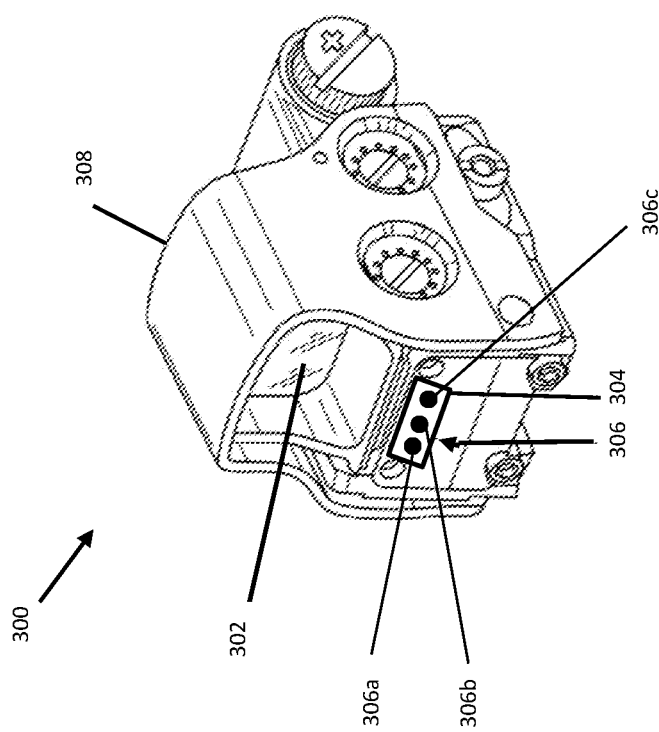
FIG. 3 illustrates an exemplary holographic sight incorporating aspects of the disclosed embodiments.

FIG. 3 illustrates a optic sight apparatus 300, such as holographic sight, incorporating aspects of the disclosed embodiments. In this example, the holographic sight includes an electro-optic sight unit 302 and a switching device 304. The switching device 304 in this example is disposed on a rear portion of the sight casing 308. In alternate embodiments, the switching device 304 can be disposed on any suitable portion of the sight 300, such as the left or right side, for example. The switching device 304 should be easily accessible by the user, without the need to reposition or to have to move their gaze to the switching device 304.

In one embodiment, the switching device 304 will include one or more buttons or switches 306. In the example of FIG. 3, there are three buttons 306a, 306b, 306c shown. In alternate embodiment, the switching device 304 can include any suitable number of switches 306.

Activation or selection of one of the switches 306a, 306b, 306c of the switching device 304 will cause the holographic sight 300 to switch or change to a different zero sight setting. Generally, each switch 306a, 306b, 306c will correspond to a predetermined or prestored sight setting. The aspects of the disclosed embodiments are configured to enable toggling or switching between different sight settings or states in a quick and easy manner.

In the example of FIG. 3, the switches 306a, 306b, 306c are push button switches. In alternate embodiments the switches 306a, 306b, 306c can include any suitable switches, other than including push buttons. For example toggle type or touch sensitive switches may be used. The push buttons can also comprise tactile devices that are configured to generate tactile sensations when the push buttons are pressed or otherwise activated. This enables manipulation of the push buttons with accuracy in low light conditions. Different buttons can provide different tactile sensations.

The switching device 304 can have any number of zero sight settings or states. In the example of FIG. 3, each of the three buttons 306a, 306b, 306c shown on the switching device 306 corresponds to a different zero sight setting. The aspects of the disclosed embodiments are not intended to be limited by the particular number of switches. In alternate embodiments, the switching device can include any number of switches other than including three.

In one embodiment, a single button can be used where each press of the button activates a different zero sight setting. For example, a first press of the button can activate or engage a close quarter sight setting or state. A second press of the same button can activate a long range sight setting or state. A third press of the same button might reactivate the close quarter sight setting, or another sight setting. The advantage of this embodiment is that the user can easily and quickly cycle through the different zero state settings without any repositioning or change in focus. In one embodiment, an indication of the selected state can be provided, such as in a window on a display of the electro-optical sight unit. Alternatively, the activation of a particular sight setting can be indicated by a sound or a light on the switch. In the embodiment where there are multiple switches, activating a switch or button will activate a sight state of the sight. For example activating one button can engage a close quarter sight setting or state, while activating another button can engage a long range sight setting or state. In one embodiment, the switching apparatus 304 can comprise a multi-position switch, where each position corresponds to a different sight setting. The aspects of the disclosed embodiments enable any suitable number of states limited only by the number of switches or switching devices.

Figure 4:
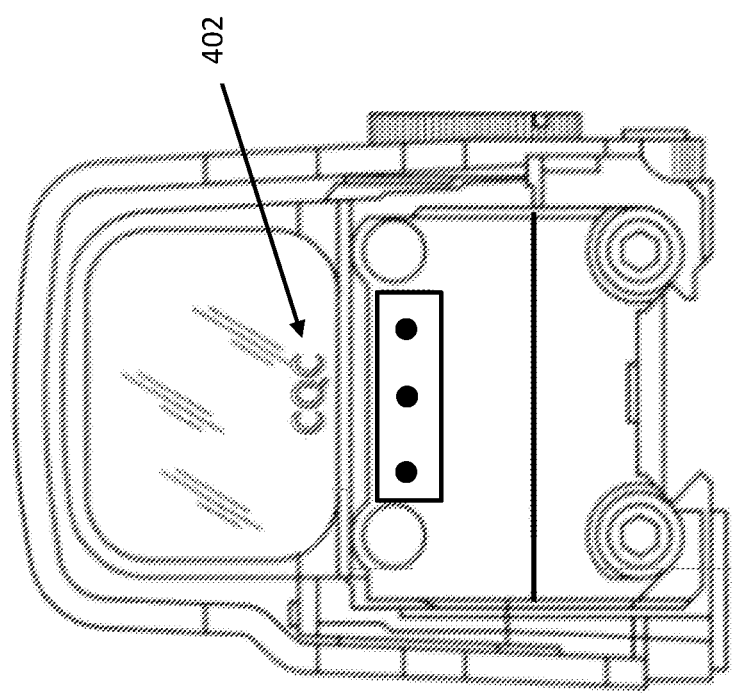
FIG. 4 illustrates an exemplary holographic sight incorporating aspects of the disclosed embodiments.

FIG. 4 illustrates an end view of a holographic sight incorporating aspects of the disclosed embodiments. In this example, activation of the switching device 306 enables a Close Quarter zero sight setting, as indicated by the legend CQC 402 on the display. The aspects of the disclosed embodiments enable the selected zero sight setting state to be readily identifiable. In the example of FIG. 4, the state is identified by a legend 402. In alternate embodiments, any suitable manner of identifying the state setting can be used, including one or more of a graphical icon or image, a color, a geometric shape, or an audible sound. The aspects of the disclosed embodiments are intended to make it easy for the user to identify the selected state.

FIG. 5 illustrates an exemplary electronics module or controller unit 500 that can be used to implement aspects of the disclosed embodiments. As illustrated in FIG. 5, the electronics module 500, which can include a circuit board 502, is disposed within a suitable housing 504. The housing 504 is typically weather and environment proof. The housing 504 can be attached to the sight device 300 shown in FIG. 3 in any suitable manner and in any suitable position. The electronics module 500 and circuit board 502 can include typical electronic and electrical components including a processor 506, such as a central processing unit (CPU), a chip or any suitable computing or computational device. In one embodiment, the electronics module 500 can be modified to include memory and storage components that are configured to carry out the processes described herein as well as store the sight settings described herein, such as the pre-set "zero" sight settings for each desired sight setting states. The memory can be coupled to the processor 506 and can include any number of memory and storage units.

The electronics module 500, in combination with the processor 506 and memory components is configured to store one or more sight settings. In one embodiment, the user will manually adjust the weapon sight for a desired sight setting, such as a close range setting. This setting will be stored by the electronics module 500. The user can manually set and store any number of desired sight settings. Each sight setting will be correlated to or corresponding to one of the states of the switching apparatus 304.

For example, where buttons 306, such as shown in FIGS. 3 and 4 are used, touching or pressing a button 306a, 306b, 306c will activate the corresponding pre-set or pre-stored sight settings that are stored in the memory. This will allow the user to toggle or switch between the different sight settings, such as close, medium and long range, that are stored in a seamless manner. When a button is selected such as by touch or pressing, the positioning of the reticle image or red dot will change or adjust, depending on the particular sight setting that is selected. A selected sight state identifying indicator will also be presented, either visually or aurally, or both.

Figure 2:
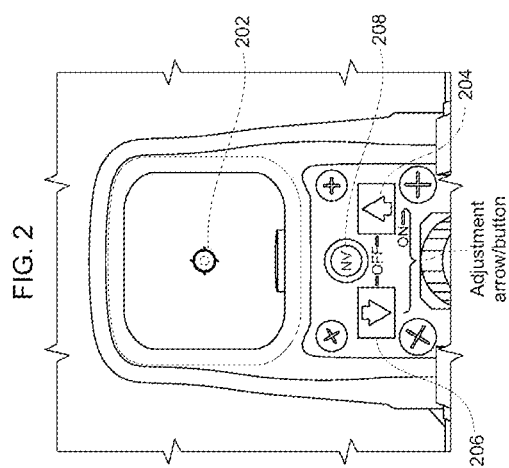
FIG. 2 illustrates a typical holographic gun sight.

In one embodiment, for an initial zero setting, the exterior universal sight adjustment components, such as the dials 102, 104 in FIG. 1 or buttons 204, 206 in FIG. 2 will be engaged and used to establish the initial or other desired sight setting. The exterior zeroing dials 102, 104 and buttons 204, 206 are adjusted as is understood to accurately zero the weapon from or for the desired distance or range. The particular setting can then be stored and assigned to a button 306a, 306b, 306c or switch position, depending on the particular type of switching device being used.

In one embodiment, a sight setting can be stored by pressing and holding one or more of the buttons 306a, 306b, 306c for a pre-determined period of time. For example, in one embodiment, once a setting is dialed in or set as described above, a press and hold of one of the buttons 306a, 306b, 306c for a pre-determined time period can be used to store in the memory of the electronic module 500, the manually dialed in setting. This can be repeated for each button 306a, 306b, 306c. In alternate embodiments, the apparatus 300 can include a separate "sight setting store" button, that when pressed, will save the current sight setting of the apparatus 300. In one embodiment, the apparatus 300 can also include a separate sight setting "clear" button, that can be used to clear a set sight setting, or clear all sight settings that are stored. The apparatus 300 will include sufficient safety and protective mechanisms that will prevent an inadvertent deletion or selection of a saved sight setting. For example, in one embodiment, a button may need to be pressed or held a specific period of time for a function associated with the button to be activated. Although only three buttons and settings are generally described herein, the aspects of the disclosed embodiments are not so limited, and can include any suitable number of buttons and sight settings, other than including three.

When the setting is stored in the memory, the user can be informed by a visual or aural indicator. Similarly, a setting might be cleared by a press and hold of one or more of the buttons 306a, 306b, 306c, or a combination of one or more buttons 306a, 306b, 306c. The aspects of the disclosed embodiments are not intended to be limited by the manner in which the settings are stored or cleared. In alternate embodiments, any suitable manner of electronically storing a sight setting can be utilized.

The aspects of the disclosed embodiments provide an automated way to change the sight setting for a weapon, such as a gun. Different sight settings, such as close range and long range, can be pre-stored in an electronics module. A specific sight setting or state can be activated by using a switching mechanism such as a button or switch. Once activated, the sight setting of the weapon will automatically adjust to the pre-stored sight setting associated with the selected button. In this manner, the user can quickly and automatically change the sight setting of the weapon. For example, with the touch of a button or activation of a toggle switch, the sight setting can be changed from a long range setting or a close quarters setting. Previously, such adjustments needed to be made manually, which is time consuming and cannot be done in a time is of the essence situation.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A optic sight apparatus for a weapon comprising:
   an electro-optical sight unit configured to project a reticle image for a sight setting of the optic sight apparatus;
   a controller electrically connected to the electro-optical sight unit; and
   a switching apparatus connected to the controller unit, the switching apparatus configured to:
   transmit a sighting control signal to the controller unit;
   determine a zero sight setting corresponding to the sighting control signal; and
   automatically change a current sight setting of the optic sight apparatus to one of a predetermined plurality of stored zeroed sight settings of the optic sight apparatus corresponding to the sighting control signal.

2. The optic sight apparatus according to claim 1, wherein the switching apparatus comprises one or more buttons, the one or more buttons corresponding to different sight settings of the optic sight apparatus, the different sight settings being stored in the controller.

3. The optic sight apparatus according to claim 2, wherein a press of a button of the one or more buttons is configured to activate a sight setting of the optic sight apparatus corresponding to the pressed button that is stored in the controller.

4. The optic sight apparatus according to claim 1, wherein the controller is further configured to:
   store the plurality of predetermined zeroed sight settings in a memory of the apparatus;
   associate the plurality of stored zeroed sight settings with one or more states of the switching apparatus;
   associate the sighting control signal with a current state of the switching apparatus; and
   select the one of the predetermined plurality of stored zeroed sight settings associated with the current state of the switching apparatus based on the sighting control signal.

5. The optic sight apparatus according to claim 4, wherein the controller is further configured to provides a range finder selection that adjusts to absolute zero at any object at which the reticle image is pointed.

6. The optic sight apparatus according to claim 4, wherein the stored plurality of predetermined zeroed sight settings comprise any variety of distances determined by a user of the weapon or set to range finder selection which displays an absolute zero on the fly in real time.

7. The optic sight apparatus according to claim 1, further comprising a manual zero sight setting adjustment device that is coupled to the controller, wherein the controller is configured to detect a manual zero sight setting of the manual zero sight setting adjustment device, store the manual zero sight setting in a memory of the controller and associate the stored manual zero sight setting with a state of the switching apparatus.

8. The optic sight apparatus according to claim 7 wherein the controller is configured to store a plurality of manually set zero sight settings in the memory of the controller, and associate the plurality of stored zero sight settings with different states of the switching apparatus.

9. The optic sight apparatus according to claim 8, wherein the switching apparatus comprises a plurality of switches, different ones of the plurality of switches corresponding to the different states of the switching apparatus, and wherein activation of a switch of the plurality of switches causes the controller to select and activate a corresponding stored zero sight setting.

10. The optic sight apparatus according to claim 9 wherein the plurality of switches comprises push buttons and a press of a push button causes the controller to select and change the sight setting of the optic sight apparatus to the corresponding stored zero sight setting.

11. The optic sight apparatus according to claim 10 wherein the push buttons comprise tactile devices configured to generate tactile sensations and enable the user of the weapon to manipulate the push buttons in low and or zero light environments with a clickable feel when pressed and or released.

12. The optic sight apparatus according to claim 1, wherein the weapon is a pistol.

13. The optic sight apparatus according to claim 1, wherein the weapon is a rifle.

14. The optic sight apparatus according to claim 1, wherein the optic sight apparatus comprises a holographic sight apparatus.

15. The optic sight apparatus according to claim 1, wherein the controller is configured to cause the electro-optical signal unit to change a projection of the reticle image of the current sight sitting to a projection corresponding to the predetermined sight setting.

16. A method for activating one of a plurality of predetermined zeroed sight settings for an optic sight apparatus for a weapon, the optic sight apparatus comprising
an electro-optical sight unit configured to project a reticle image for a sight setting of the optic sight apparatus;
a controller electrically connected to the electro-optical sight unit; and
a switching apparatus connected to the controller unit, wherein the method further includes:
detecting a sighting control signal sent by the switching apparatus to the controller;
determining a zero sight setting corresponding to the sighting control signal; and
automatically selecting a sight setting from one of a plurality of stored zeroed sight settings of the optic sight apparatus responsive to the detected sighting control signal; and
automatically changing a current sight setting of the optic sight apparatus to the selected sight setting.

17. The method according to claim 16, wherein activation of the sight setting comprises one or more of touching or pressing a button of the switching apparatus, the switching apparatus comprising one or more buttons, the one or more buttons corresponding to different sight settings of the optic sight apparatus, the different sight settings being stored in the controller, and correlated to respective ones of the different one or more buttons.

18. The method according to claim 17, wherein a press of a button of the one or more buttons is configured to activate a sight setting of the optic sight apparatus corresponding to the pressed button that is stored in the controller.

19. The method according to claim 16, wherein the method further includes:
storing the plurality of predetermined zeroed sight settings; and
associating the plurality of predetermined zeroed sight settings with respective states of the switching apparatus; and
wherein the selected sight setting corresponds to a current state of the switching apparatus.

20. The method according to claim 19, wherein the push buttons comprise tactile devices and the method includes generating a tactile sensation when one of the push buttons is pressed and or released.

* * * * *